A. SEYMOUR-JONES.
PNEUMATIC OR LIKE ROLLER.
APPLICATION FILED DEC. 19, 1918.

1,365,606.

Patented Jan. 11, 1921.

INVENTOR:
Alfred Seymour-Jones
By Wm Wallace White
ATTY.

UNITED STATES PATENT OFFICE.

ALFRED SEYMOUR-JONES, OF WREXHAM, WALES, ASSIGNOR TO THE TURNER TANNING MACHINERY COMPANY, OF PEABODY, MASSACHUSETTS.

PNEUMATIC OR LIKE ROLLER.

1,365,606.  Specification of Letters Patent.  Patented Jan. 11, 1921.

Application filed December 19, 1918. Serial No. 267,450.

*To all whom it may concern:*

Be it known that I, ALFRED SEYMOUR-JONES, subject of the King of Great Britain, residing at Wrexham, Denbighshire, North Wales, Great Britain, have invented new and useful Improvements in or Relating to Pneumatic or like Rollers, of which the following is a specification.

This invention relates to pneumatic or like rollers such for example as are used as work supporting devices in hide, skin and leather working machines and also in various machines for different purposes.

The object of the invention is to improve the construction of flexible rolls of the pneumatic type with a view to obtaining therein equal or uniform resiliency throughout the entire length, maintaining perfect cylindrical shape, and also to increase their efficiency.

The invention concerns more particularly rubber covered rollers but is also applicable to other rollers provided with an outer flexible envelop, and where fluid under pressure is contained between the inclosing envelop or covering and a mandrel or core upon which the envelop or covering is mounted.

In flexible rollers of the pneumatic or like kind, various means have been adopted with a view to obtaining uniform resiliency and for preventing undue expansion. In some cases where the fluid under pressure has merely been inclosed by the flexible envelop, the yielding portion of the latter has at certain points been limited in its outward movement by connecting means, such as tapes, bands or metal arms, between said portion and the mandrel or core for the purpose of preventing undue expansion of said portion at these points. In other cases instead of the elastic fluid under compression being free within the space between the flexible envelop and the mandrel, it has been contained in one or more rubber tubes, such for instance as a rubber tube arranged spirally about the mandrel or in circumferential or longitudinal tubes suitably inflated.

I propose to construct a pneumatic or like roll in which while practically the entire inner surface of the flexible envelop is connected with the mandrel or core in such a manner that undue expansion of any part of the exterior of the roll is prevented, the elastic fluid under compression within the roll is free, or at any rate is in such condition of freedom that the rapid displacement of the same from one part of the interior to another can take place.

The principal improvement constituting the invention lies in the intermediate connecting means employed between the flexible envelop and the mandrel, it being a feature that in addition to limiting the expansion of the envelop and permitting free or substantially free displacement of the elastic fluid, such means also constitute a cushion to prevent undue compression of the flexible envelop such as might otherwise force it into contact with the mandrel or core.

The invention consists of a pneumatic or like roll of the kind herein referred to, wherein the space between the flexible envelop and the mandrel or core is occupied by a cellular or porous material, such for example as rubber-sponge, attached respectively to the said mandrel and envelop, and means are provided for admitting a fluid into the said interior space for the purpose of forming a resilient cushion.

Preferably the material known as rubber-sponge is used to occupy the space and constitute the connecting medium between the flexible envelop and the mandrel, which material is believed to be eminently suitable for the purpose seeing that it is, (*a*) resilient and therefore suitable for providing the cushioning effect to prevent undue compression of the flexible envelop, (*b*) sufficiently compact to form a yielding binding medium to prevent undue expansion of the flexible envelop, (*c*) cellular or porous and therefore able to permit of comparatively free displacement of the fluid under pressure, and (*d*) easily secured in position such as by vulcanization. The invention is not however, to be restricted to rubber-sponge as the improved pneumatic or like roll may be provided with a filling of some equivalent material *i. e.* a material which if not possessing all the above mentioned qualities is suitable for constituting a binding or restricting medium, is adapted to act as a cushion without detrimentally affecting compression, and is porous, cellular or of some similar character.

The use of a filling of the kind referred to is advantageous in that there is no possibility of the same creeping either circumferentially or longitudinally. The porous rubber-sponge material employed as described in a flexible roll with air or other fluid therein as a resilient medium provides such roll with an elastic surface possessing uniform resiliency throughout its entire length, while at the same time the yielding binding effect of the filling maintains the perfect cylindrical form of the outer surface of the roll.

The invention includes in association with the before mentioned principal improvement features of construction which will be hereinafter set forth.

In further describing the invention reference will be made to the accompanying drawing wherein some practical forms of the invention are shown by way of example.

Figure 1:
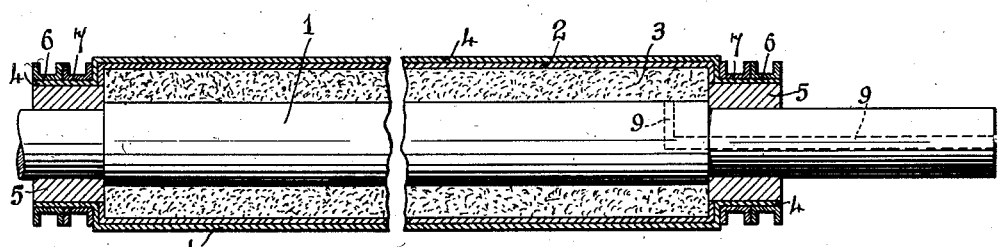
Figures 1, 2 and 3 are longitudinal sections of pneumatic rollers having the filling material in different forms.
Figures 5, 6:
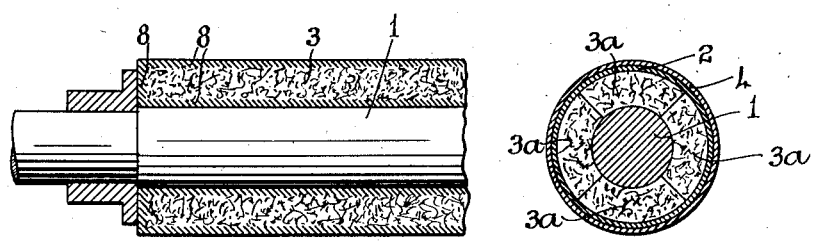
Fig. 6 is a longitudinal section showing the filling in a further form.

In the form illustrated in Fig. 1 the pneumatic roller consists of a core or mandrel 1, a flexible envelop 2 of canvas and an intermediate filling 3 of rubber-sponge. The rubber-sponge filling 3 is vulcanized on to the mandrel 1 and to the canvas cover 2 and may consist of one mass which completely fills the space between the mandrel and cover. Instead of being in a mass as just mentioned the filling 3 may be laid on the mandrel in long strips $3^a$ of segmental shape as shown in Fig. 5 these being cut to shape to fit the roll. The said strips $3^a$ are vulcanized on to the mandrel and to the cover.

In another form (Fig. 2) the porous filling may be applied to the mandrel 1 in the form of a strip $3^b$ wound spirally around said mandrel and vulcanized to the mandrel 1 and cover 2. In a further form (Figs. 3 and 4) the porous filling consists of washers $3^c$ placed side by side on the mandrel 1 and vulcanized to the latter and to the cover 2.

In each of the forms shown in Figs. 1 to 5 the flexible cover 2 has thereon an outer covering 4 of rubber which may constitute the work supporting surface of the roller. The outer covering 4 may form a permanent part of the roller but one of the features of the invention is to make the casing or envelop 2, which incloses the resilient porous filling, thin and smooth and to employ in combination therewith a sleeve, such as 4, conveniently formed of rubber or rubber and canvas, adapted to be drawn on to said envelop 2 and secured in a suitable manner. The object of this feature of improvement is to enable the outer working surface of the roller to be conveniently removed and replaced by a new one when worn. The outer removable surface or sheath may be attached at each end to the mandrel or core 1 or to end collars such as 5 or other appropriate devices thereon which will prevent its rotation upon the supporting flexible envelop. For the purpose of lubrication, powdered French chalk, blacklead, fullers' earth or similar material may be introduced between the flexible envelop 2 and outer sheath 4. In the construction shown in Figs. 1, 2 and 3, the outer sleeve 4 is secured to the collars 5 by means of clamp rings 6, 7 but it will be understood that any suitable form of fastening may be adopted for securing the outer cover 4 and making the roll air-tight.

In Fig. 6 there is illustrated a construction of the improved roller wherein the inner canvas or inclosing envelop is eliminated and the mandrel 1 has thereon a cylindrical cushion consisting of an interior of porous or sponge-rubber 3 combined with an exterior of solid rubber 8 the latter forming a complete inclosure for the sponge-rubber and being formed with it. In other words the cushion is constituted by a cylinder of rubber which has a solid exterior and a porous or spongy interior.

Figure 2:
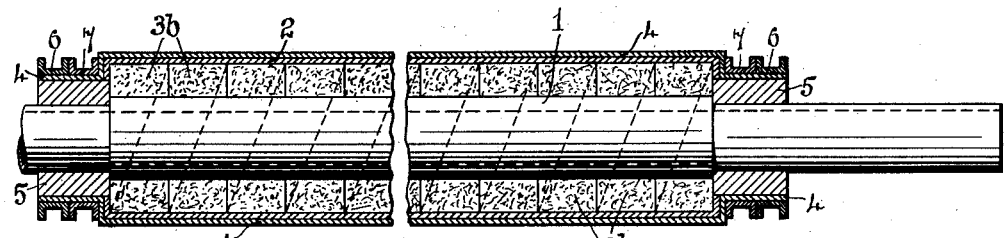
Figures 3, 4:
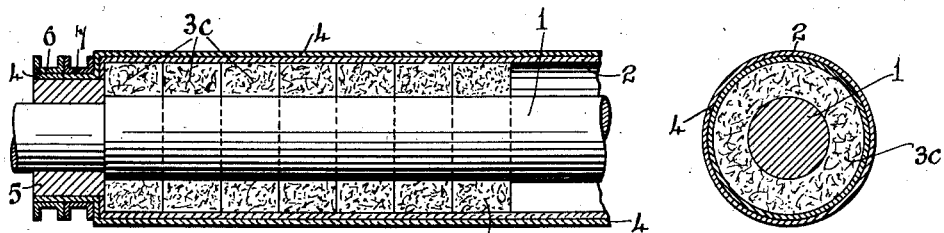
Figs. 4 and 5 are cross sections of the rollers shown in Figs. 3 and 1 respectively.

The mandrel or core 1 may be solid in which case, as shown at 9 in Fig. 1, it may be bored to provide for circulation of air through the porous interior 3. Or the mandrel may be hollow or tubular as shown in Fig. 2 in which case suitable holes or openings (not shown) may be formed through the side to provide for passage of air to the interior 3. Either of these forms of mandrel may be used with any of the constructions of rollers described. In the case of the construction shown in Fig. 6 suitable communicating holes or openings are formed in the solid rubber surrounding the mandrel. Other means may however, be adopted for air circulation in the porous interior of the rollers. Instead of vulcanizing the parts as previously described they may be secured by cementing same or fastening in any other suitable manner.

The inclosing envelop 2 may be made of canvas alone or canvas and rubber, or other suitable material, the preferred manner of forming the improved roller being to cover the mandrel with the porous material and then cover the latter with one or more layers of the material which is to form the flexible inclosing envelop. While it is preferred to make the outer covering 4 of rubber or rubber and canvas, the invention is not to be limited in this direction as other suitable material may be used for this purpose.

Instead of employing a separate outer sheath, the flexible envelop itself may, as shown in Fig. 6, be made of sufficient thickness and of a suitable material to constitute the working surface of the roller.

The details of construction may be varied without departing from the scope of the invention.

What I claim then is:—

1. A pneumatic or like roll of the kind herein referred to comprising, in combination, a mandrel or core, an air tight flexible envelop, a filling of rubber sponge occupying the interior space between the mandrel and envelop and vulcanized to both, an outer covering combined with the envelop, and means for admitting a fluid into said interior space for the purpose of forming a resilient cushion.

2. A pneumatic or like roll of the kind herein referred to comprising, in combination, a mandrel or core, a flexible envelop, an outer covering removably combined with the envelop said envelop and covering being secured in an air tight manner to the mandrel, a filling of rubber sponge occupying the interior space between the mandrel and envelop and vulcanized to both, and means for admitting a fluid into said interior space for the purpose of forming a resilient cushion.

3. A pneumatic or like roll of the kind herein referred to comprising, in combination, a mandrel or core, collars thereon, a flexible envelop, an outer covering combined with said envelop, clamp rings securing said envelop and covering in an air tight manner to the collars so as to provide an air-tight space between said mandrel and envelop, a filling of rubber sponge occupying said air space and vulcanized to said mandrel and envelop, and means for admitting a fluid into said interior air space for the purpose of forming a resilient cushion.

4. A pneumatic or like roll of the kind herein referred to comprising, in combination, a mandrel or core, a flexible envelop secured to the mandrel in an air tight manner and so as to provide an air space between said mandrel and envelop, and a filling of rubber-sponge occupying said air space and vulcanized to the mandrel and envelop, the mandrel having an air passage formed therein communicating between its end and the said air space.

In testimony whereof I have signed my name to this specification.

ALFRED SEYMOUR-JONES.